Patented Feb. 18, 1947

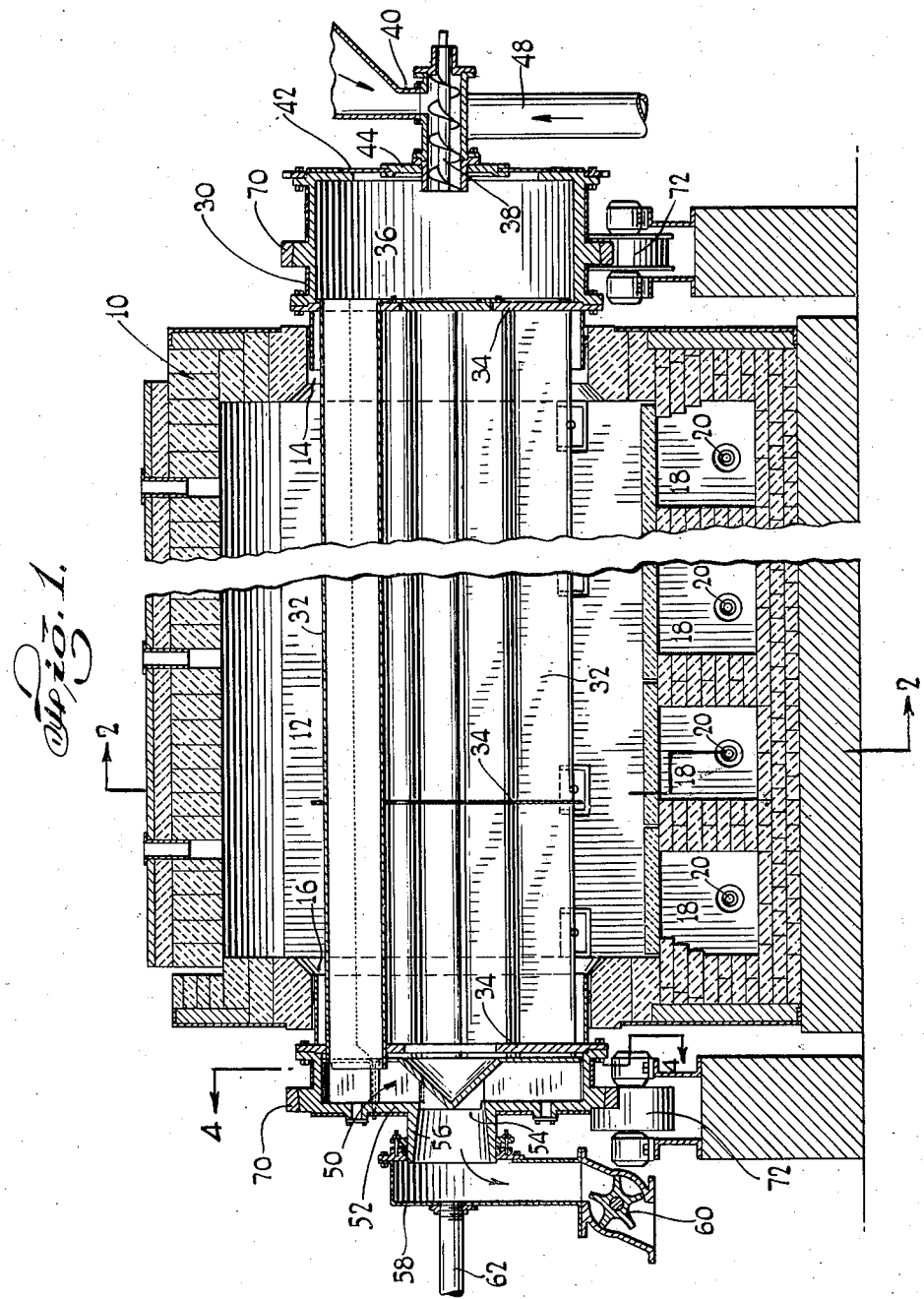

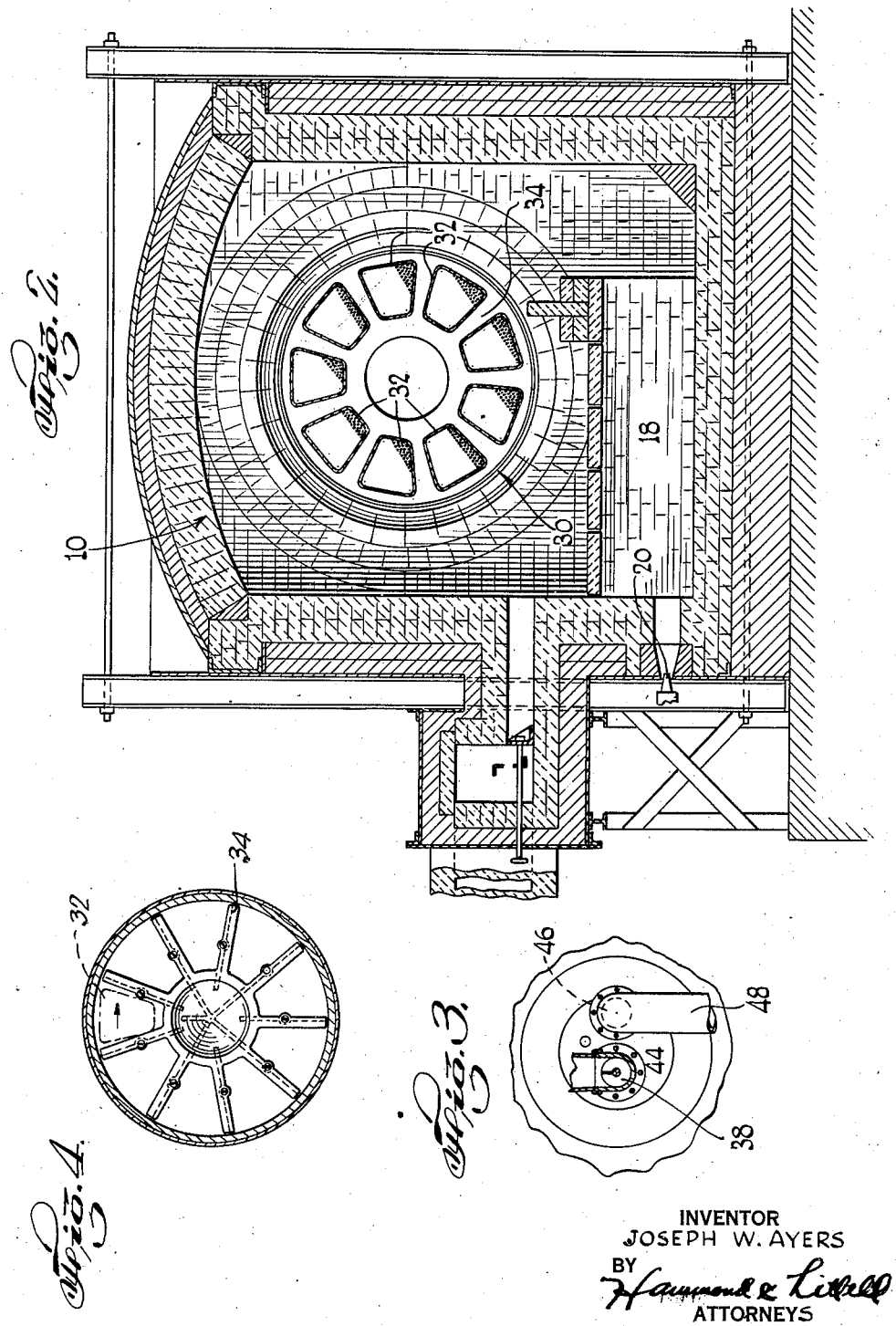

2,416,138

UNITED STATES PATENT OFFICE 2,416,138

METHOD OF PRODUCING IRON OXIDE FOR PIGMENT PURPOSES

Joseph W. Ayers, Easton, Pa., assignor to C. K. Williams & Co., a corporation of Pennsylvania Application June 8, 1939, Serial No. 278,027

11 Claims. (Cl. 23—200)

This invention relates to a new and useful process for the production of red iron oxide pigments.

Pure red iron oxide is one of the principal colored pigments used by the paint, rubber, linoleum and similar industries. This pigment is valued for its high coloring power, its range of shades and its permanence in the presence of acids, alkalis, sunlight and heat.

For use in the rubber industry it is essential that the manganese content of iron oxide pigments be below a specified limit, usually 0.05%. The presence of larger amounts of manganese is objectionable because it accelerates the aging of rubber compounds. Since the principal raw material for the manufacture of iron oxide is ferrous sulfate made from pickling liquor or scrap iron, containing an appreciable quantity of manganese, it has always been a problem in the iron oxide industry to produce pigments sufficiently low in manganese.

The process generally employed for the manufacture of pure red iron oxides involves the calcination or thermal decomposition of ferrous sulfate in a rotary kiln. The kilns are slightly inclined cylindrical tubes, varying from 50 to 100 feet in length and from 5 to 10 feet in diameter, which are lined with refractory material and mounted for rotation at a suitable speed. Ferrous sulfate is charged into the elevated end of the kiln and passes by gravity through the entire tube during rotation, to be discharged at the lower end. A fire-box is located adjacent the lower end of the kiln, and heat and gases from the combustion of coal, coke, gas or oil in this fire-box sweep through the kiln in contact with the ferrous sulfate and exit through a flue at the upper end of the kiln.

This known process has a number of defects and shortcomings which have not been overcome prior to my invention. When treating the usual ferrous sulfate material, containing from about .15 to .5% of manganese sulfate, it is impossible to obtain a high yield of iron oxide and also to keep the manganese oxide content of the finished oxide below .05%. The conversions of ferrous sulfate to iron oxide and of manganese sulfate to manganese oxide take place in overlapping temperature ranges under practical operating conditions, and when maximum calcination temperatures in the kiln are kept low enough to ensure the presence of less than .05% of manganese oxide in the final iron oxide product, the total conversion of ferrous sulfate to iron oxide does not exceed about 70%. This renders process operations quite inefficient and uneconomical, and a comparatively large amount of ferrous or ferric sulfate must be washed from the final product. When attempts are made to increase the iron oxide yield, for example, to as much as 90%, the content of manganese oxide in the product rises to about .2% or more, which is far in excess of trade specification for rubber pigments or the like. Furthermore, iron oxide containing much more than .05% of manganese oxide is darkened and discolored to an objectionable extent.

Another important shortcoming of the conventional process for the production of red iron oxide pigments resides in the difficulty of obtaining a uniform product of bright color and low manganese content. This may be attributed to several features of process operation. The atmosphere supplied to the ferrous sulfate during the calcination is composed of combustion gases from the fuel and an indeterminate amount of air, so that it is impossible to maintain uniform or controlled atmospheric conditions in the kiln. Also, the temperature of the combustion gases entering the kiln tube practically determines the temperatures throughout the length of the tube, so that there is little opportunity for close control over, or variation of, temperature conditions or other conditions of reaction. To obtain a practical conversion of ferrous sulfate to ferric oxide high temperatures are necessary, and these result in local overheating of parts of the charge in the kiln with attendant discoloration of the product and excessive conversion of manganese sulfate to insoluble manganese oxide. Furthermore, the heat transmission and heat efficiency in this known process are low, and heat requirements are high in the absence of definite quantities of oxygen because the conversion to iron oxide under such conditions takes place, at least in part, through a heat-consuming reaction involving the production of sulfur dioxide and the formation and decomposition of ferric sulfate.

A further shortcoming of the conventional process consists in the absence of control over the composition of gases inside the kiln. As explained more fully hereinbelow, I have found that the manganese content of the iron oxide may be affected favorably by controlling the composition of the gases, yet this is impossible when using the prior process.

In addition, the usual practice involves waste and inefficiency in that sulfur oxides generated in the kiln are so diluted by furnace gases that the recovery of gas values is impractical, and all of the decomposition gases are generally released into the air.

I have now discovered and provided a new process for the production of red iron oxide pigments which to a large extent overcomes these defects and shortcomings of the conventional process.

An important object of my invention is to provide a process by which a high conversion of ferrous sulfate to iron oxide may be obtained while producing pigments containing a very small amount of manganese oxide. According to the process disclosed herein, for example, 90 to 92% yields of iron oxide containing less than .05% of manganese oxide are readily obtained from ferrous sulfate having a manganese sulfate content of about .40%. This represents an outstanding improvement in yield, for the same grade of product, as compared with the prior process.

Another object of my invention is to provide a process for producing pure red iron oxide pigments which enables important savings and economies in the amount of raw material required for a given output of pigment, in the producing capacity of decomposition apparatus of given size and in the washing operations by which unconverted iron sulfates and other impurities are removed from the iron oxide.

Another object of the invention is to provide a process which produces red iron oxide pigments having improved and more uniform color qualities, and by which the color qualities of the pigments may be readily controlled so as to obtain a greater variety of products.

Still another object of the invention is to provide a process for producing red iron oxide pigments which is characterized by greater heat efficiency than prior processes and by substantial freedom from over-treatment and under-treatment of parts of the material during the calcination, thereby improving the economy, efficiency and results of process operations.

The process of the present invention may be used for the production of red iron oxide pigments from various grades and types of iron-bearing materials that may be converted to iron oxide by calcination treatment. It is of particular value, however, for the production of pure red iron oxide from ferrous sulfate containing appreciable amounts of manganese, such as the usual ferrous sulfate made from pickling liquor or scrap iron, containing from about .15 to .5% of manganese sulfate. The preferred practice is to prepare such material for the production of iron oxide by drying and dehydrating $FeSO_4.7H_2O$ to obtain $FeSO_4.H_2O$.

According to the present invention, I have found that the above-mentioned and other objects may be attained by a new process in which ferrous sulfate or the like is treated in a closed roasting zone, under controlled conditions as of temperature, atmosphere, etc., and in which the conversion to iron oxide is carried out so as to obtain a high production yield of iron oxide while repressing the conversion of manganese sulfate to manganese oxide. By this new process a calcination product containing a very high percentage of iron oxide and a very low percentage of manganese oxide is obtained, so that comparatively simple washing operations serve to remove unconverted impurities, such as iron and manganese sulfates, from the product and to produce red iron oxide pigments of improved qualities at materially reduced cost.

One of the principal features of the new process is that the decomposition of the ferrous sulfate is effected by transmitting heat thereto indirectly under closely regulated temperature and atmospheric conditions and in the absence of combustion gases such as are present in the conventional process. In practice, for example, a rotating muffle is provided for this purpose, which is substantially gas-tight except that means are provided for feeding and discharging solid materials, and also means for supplying gases to, and for exiting gases from, reacting materials inside the muffle. The walls of the muffle are made of heat-conducting material, and the muffle is surrounded with a firebox in which any selected fuel may be combusted, at selected locations, in order to heat the muffle and its contents to predetermined and well-controlled temperatures. In this way, heat is transmitted indirectly to ferrous sulfate inside the muffle, under controlled conditions of reaction, and gases of uncontrolled composition are excluded from the charge during the course of the conversion; also, objectionable local over-heating and under-heating of parts of the charge are avoided to the maximum extent.

If desired, the decomposition of ferrous sulfate in the conversion zone of the muffle may be carried out in the presence of an oxidation-retarding catalyst, and I consider such practice within the scope of my invention, although the use of catalysts is not necessary to secure beneficial results from new practices herein described. The preferred catalysts are inorganic salts of alkali metals, the most common and inexpensive of which is sodium chloride. When an oxidation-retarding catalyst is used the catalyst may be carried into the zone of decomposition so as to give effective and highly uniform action by spray-coating the ferrous sulfate with a solution of the catalyst before feeding the material into the heating zone. Small amounts of the catalyst are sufficient; for example, about .3%, based on the weight of iron oxide theoretically obtainable from the charge, gives very good results. The catalysts used are neither reducing nor oxidizing agents, but are non-reactive with respect to the charge. Amounts of catalyst as high as 3% or more are harmful to the quality of the product and should not be used. For best results the amount of catalyst should be determined in advance for each particular shade of iron oxide, and variations in catalyst control may be found desirable with variations in temperatures and atmospheric conditions in the conversion zone of the muffle.

I have found that the decomposition of ferrous sulfate according to the present process, with or without an oxidation-retarding catalyst, has beneficial effects on the manganese content and color qualities of iron oxide obtained from the calcined material, as the process can be operated to inhibit the conversion of manganese sulfate to manganese oxide and yet produce a high conversion of ferrous sulfate to ferric oxide.

In the practice of the present process according to a preferred embodiment, ferrous sulfate crystals with or without a suitable catalytic salt are continuously fed into one end of a closed muffle and passed therethrough by gravity during rotation of the muffle, and calcined material is continuously discharged from the other end of the muffle after a predetermined time of treatment. During its passage through the apparatus, the material is heated indirectly as above described, and the conditions of reaction are established and controlled so that the material is treated uniformly at predetermined maximum decomposition temperatures and under controlled muffle gas conditions to yield a calcined product of predetermined qualities with respect to iron oxide content, color shade and tint and manganese oxide content. The material discharged from the muffle is washed to remove soluble impurities, giving an 85 to 92% yield of valuable iron oxide pigment containing less than .05%, and usually about .02 to .04%, of manganese oxide.

I have found that particularly valuable results are obtained by treating ferrous sulfate according to this process at selected maximum temperatures between 1300 and 1550° F., i. e., above 1300° F. but not exceeding about 1550° F. Although decomposition of both ferrous sulfate and manganese sulfate would normally take place in this temperature range, a high rate of conversion of ferrous sulfate to iron oxide is readily obtained when using this process while avoiding appreciable conversion of manganese sulfate to manganese oxide. Higher temperatures in the above range result in increased rates of production for a muffle of given size, but temperatures above 1550° F. increase the conversion to manganese oxide. For a given shade of iron oxide and a very low manganese oxide content the maximum decomposition temperature should be somewhat lower in the absence of a catalyst than in the corresponding treatment when a catalyst is present.

Another feature of the new process resides in carrying out the decomposition, as above described, while supplying regulated amounts of oxygen-containing gases to the material undergoing treatment. In the preferred practice, air is introduced into the muffle in amounts at least sufficient to support active conversion of ferrous sulfate according to the reaction:

(1) $2FeSO_4.H_2O + \tfrac{1}{2}O_2 = Fe_2O_3 + 2SO_3 + 2H_2O$ 

This reaction, activated by the presence of adequate amounts of oxygen, permits the production of iron oxide at maximum thermal efficiency, and it eliminates additional heat that is required, in the presence of combustion gases and insufficient amounts of oxygen, where the conversion proceeds to a substantial extent according to the reactions:

(2) $6FeSO_4.H_2O =$ 

$2Fe_2O_3 + Fe_2(SO_4)_3 + 3SO_2 + 6H_2O$ 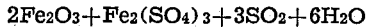

and (3) $Fe_2(SO_4)_3 = Fe_2O_3 + 3SO_3$ 

or, combining (2) and (3);

(4) $2FeSO_4.H_2O = Fe_2O_3 + SO_2 + SO_3 + 2H_2O$ 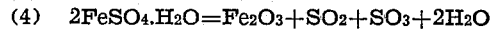

Since the heat requirements for the conversion are lowered by the present process, maximum conversion temperatures in the muffle need not be as high for a given production and yield of iron oxide, which in part accounts for the lowered manganese oxide content of the iron oxide and the improved heat efficiency of the process.

Still another feature of the invention resides in restricting the supply of gases to the materials in the muffle, while preferably supplying at least enough oxygen for Reaction 1, so as to regulate the composition of gases in contact with decomposing materials inside the muffle. It has been found that, at given conversion temperatures, color brightness in the iron oxide product may be developed in proportion to the reciprocal of air flow through the muffle. Moreover, it has been found that the manganese oxide content of the product increases with increasing amounts of air. This may be attributable to the decreased rate of oxidation in the absence of excessive amounts of oxygen.

I have further discovered that the manganese quality of the product is favorably affected by maintaining comparatively high concentrations of sulfur oxides in the atmosphere of the muffle. According to preferred embodiments of the invention, the supply of air or other gases may be controlled so that the gases exhausted from the muffle contain at least 10%, usually about 12 to 15%, of sulfur oxide, and a product containing a high percentage of iron oxide of excellent color qualities and a very low percentage of manganese oxide may be obtained by such operations. There apparently is no difference between the action of $SO_2$ and $SO_3$ in this respect.

The maintenance of high sulfur gas concentrations in the gases exhausted from the muffle has the further advantage that it makes it economical and practical to recover sulfur values from the gases, according to the process disclosed and claimed in a copending application, Serial No. 278,028, filed June 8, 1939, now United States Letters Patent No. 2,394,579. The economy of such recovery increases with increasing concentrations of $SO_3$ in the gases. Although high temperatures and retarded gas flow are favorable to the decomposition of $SO_3$ into $SO_2$ and $O_2$, I am able consistently to produce exit gases in which $SO_3$ represents from about 50 to 60% of the sulfur gases. Important advantages and savings are realized by employing the $SO_3$, or the $SO_2$ and $SO_3$, in such gases for the production of sulfuric acid, as disclosed and claimed more particularly in the above-mentioned application.

The process of the present invention may be carried out by the use of various forms and designs of muffle apparatus. A particularly suitable type of apparatus is illustrated in the accompanying drawings, in which Figure 1 is a vertical longitudinal section showing the assembly and construction of a furnace and rotary muffle;

Figure 2 is a vertical cross section, along the line 2—2 of Figure 1;

Figure 3 is a fragmentary end view of the muffle, as viewed from the right-hand end of Figure 1; and Figure 4 is a vertical cross section showing details of muffle construction, taken along the lines 4—4 of Figure 1.

As shown in the drawings, a furnace or firebox 10 is constructed of firebrick or other suitable refractory material to provide an elongated heating chamber 12 through which extends a rotary muffle 30 for carrying out the decomposition of ferrous sulfate. The furnace walls are provided with oppositely disposed openings 14 and 16, and opposite end portions of the muffle 30 project through these openings. The furnace includes a plurality of combustion chambers 18 in which suitable fuel from burners 20 may be combusted at selected points. These burners are adapted to combust fuel, such as fuel oil, in chambers 18 in order to heat the muffle 30 and materials therein to selected conversion temperatures.

The main body of the muffle 30 comprises a plu-

substantially uniform composition in said zone during the decomposition.

3. A process for producing iron oxide pigments from ferrous sulfate containing an appreciable quantity of manganese sulfate which comprises decomposing the ferrous sulfate by heating the same in a substantially closed conversion zone, out of direct contact with flame or combustion gases, at ferrous sulfate conversion temperatures in the presence of an added inorganic alkali metal salt while introducing an amount of air into said zone sufficient to support oxidation of said ferrous sulfate to ferric oxide.

4. The process for producing iron oxide pigments from ferrous sulfate containing an appreciable quantity of manganese sulfate which comprises providing said ferrous sulfate in substantially the monohydrate form, heating a continuous stream of said ferrous sulfate, out of direct contact with flame or combustion gases, to predetermined decomposition temperatures above 1300° F., during the heating supplying to said stream a continuous stream of oxygen-containing gas in an amount sufficient to furnish at least ½ mol of oxygen for every mol of ferrous sulfate heated, so as to support direct conversion of the ferrous sulfate to ferric oxide, but so restricted in amount as not to reduce the sulfur oxide content of the reaction atmosphere below about 10%, and continuing the heating until at least 85% conversion of ferrous sulfate to ferric oxide containing less than .05% of manganese oxide has been obtained.

5. The process for producing pure iron oxide pigments from ferrous sulfate containing from .15 to .50% of manganese sulfate which comprises heating the ferrous sulfate in substantially the monohydrate form indirectly in a substantially closed conversion zone to predetermined decomposition temperatures above 1300° F. but not exceeding about 1550° F. in the presence of an added amount less than 3% of sodium chloride and in the presence of an oxidizing atmosphere containing a relatively high concentration of sulfur oxide gases, thereby repressing the conversion of manganese sulfate to manganese oxide, and continuing the heating until at least 85% conversion of ferrous sulfate to ferric oxide containing less than .05% of manganese oxide has been obtained.

6. The process for producing pure iron oxide pigments from ferrous sulfate containing from .15 to 50% of manganese sulfate which comprises heating the ferrous sulfate in substantially the monohydrate form to predetermined decomposition temperatures above 1300° F. but not exceeding about 1550° F. in the presence of an added water soluble inorganic alkali metal salt that inhibits the formation of manganese oxide in the product and in the presence of an oxidizing atmosphere containing a relatively high concentration of sulfur oxide gases, thereby repressing the conversion of manganese sulfate to manganese oxide, continuing the heating until at least 85% conversion of ferrous sulfate to ferric oxide containing less than .05% of manganese oxide has been obtained, and washing the product of the heating to remove soluble impurities and obtain substantially pure red iron oxide containing less than .05% of manganese oxide.

7. The process for producing pure red iron oxide pigments from ferrous sulfate containing an appreciable quantity of manganese sulfate which comprises heating the ferrous sulfate in substantially the monohydrate form indirectly, out of contact with flame or combustion gases, to decomposition temperatures above 1300° F., supplying air for the decomposition in an amount at least sufficient to support direct conversion of the ferrous sulfate to ferric oxide while restricting the air supply so as to maintain at least 10% of sulfur oxides in the atmosphere contacting the materials during the heating, and continuing the heating until at least 85% conversion of ferrous sulfate to ferric oxide containing less than .05% of manganese oxide has been obtained.

8. In a process for the production of iron oxide by the calcination of monohydrate ferrous sulfate containing appreciable amounts of manganese sulfates, the steps which comprise carrying out the calcination by heating the ferrous sulfate indirectly, out of contact with flame or combustion gases, to decomposition temperatures above 1300° F. in the presence of an added inorganic alkali metal salt that inhibits the formation of manganese oxide at such temperatures, supplying air to the ferrous sulfate during the heating, and limiting the air supply so as to maintain at least 10% of sulfur oxides in the atmosphere contacting the ferrous sulfate during the heating.

9. In a process for the production of iron oxide by the calcination of dehydrated ferrous sulfate containing appreciable amounts of manganese sulfate, the steps which comprise carrying out the calcination by heating the ferrous sulfate indirectly, out of contact with flame or combustion gases, at selected decomposition temperatures above 1300° F. but not exceeding about 1550° F. and in the presence of oxygen and of an added water soluble inorganic alkali metal salt that inhibits the formation of insoluble manganese salt at such temperatures.

10. The method of controlling the production of ferric oxide from ferrous sulfate containing from .15% to .50% of manganese sulfate to produce a high yield of ferric oxide having a low manganese oxide content, which comprises carrying out the conversion upon the ferrous sulfate in substantially the monohydrate form, in a continuously operating closed roaster process at ferrous sulfate conversion temperatures at which conversion of manganese sulfate tends also to occur, during the conversion supplying a regulated stream of air into the roaster in amount sufficient to support the reaction

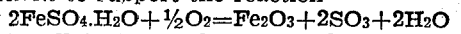
$2FeSO_4 \cdot H_2O + \tfrac{1}{2}O_2 = Fe_2O_3 + 2SO_3 + 2H_2O$ but insufficient to reduce the sulfur oxide content of the roaster gases below about 10%, discharging the charged material from the roaster after more than 85% of the ferrous sulfate has been converted to ferric oxide and before the manganese oxide content of the material has reached .05%, and washing unconverted sulfates from the discharged material to obtain more than an 85% yield of iron oxide containing less than .05% of manganese oxide.

11. The method of controlling the manganese oxide content of pigment iron oxides calcined from ferrous sulfate containing manganese sulfate as an impurity, which comprises continuously supplying such ferrous sulfate in substantially the monohydrate form into a continuously rotating closed roaster, calcining said ferrous sulfate in said roaster at selected temperatures above 1300° F. but not exceeding about 1550° F., at which rapid conversion of ferrous sulfate takes place and in the presence of an added amount less than 3% of a water soluble inorganic alkali metal salt that inhibits the formation of manganese oxide in the product, continuously supplying a regulated stream of air to the material in the roaster at a rate sufficient at least to oxidize the ferrous sulfate to ferric oxide and sulfur trioxide, continuing the calcination until over 85% of the ferrous sulfate has been converted into ferric oxide containing less than .05% of manganese oxide, continuously discharging the calcined material from the roaster, and washing impurities from the calcined material to obtain more than an 85% yield of iron oxide pigment containing less than .05% of manganese oxide.

JOSEPH W. AYERS.

REFERENCES CITED

The following references are of record in the file of this patent:

UNITED STATES PATENTS

| Number | Name | Date |
|---|---|---|
| 1,428,521 | Bacon | Sept. 12, 1922 |
| 1,455,060 | Bacon | May 15, 1923 |
| 1,489,347 | Davison | Apr. 8, 1924 |
| 1,630,881 | Zalacostas | May 31, 1927 |
| 1,642,975 | Stewart | Sept. 20, 1927 |
| 1,813,649 | Weise | July 7, 1931 |
| 2,065,547 | Arnold | Dec. 29, 1936 |
| 2,098,056 | McBerty | Nov. 2, 1937 |
| 2,059,499 | Sweet et al | Nov. 3, 1936 |
| 267,582 | Phelps et al | Nov. 14, 1882 |
| 1,045,723 | McFetridge | Nov. 26, 1912 |

FOREIGN PATENTS

| Number | Country | Date |
|---|---|---|
| 230,774 | British | Oct. 5, 1925 |
| 4,201 | British | 1881 |
| 3,217 | British | 1867 |